United States Patent
Makita et al.

(10) Patent No.: US 12,307,783 B2
(45) Date of Patent: May 20, 2025

(54) APPARATUS AND METHOD FOR ESTIMATING DISTANCE AND NON-TRANSITORY COMPUTER-READABLE MEDIUM CONTAINING COMPUTER PROGRAM FOR ESTIMATING DISTANCE

(71) Applicant: TOYOTA JIDOSHA KABUSHIKI KAISHA, Toyota (JP)

(72) Inventors: Shota Makita, Nagoya (JP); Satoshi Takeyasu, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 412 days.

(21) Appl. No.: 17/733,110

(22) Filed: Apr. 29, 2022

(65) Prior Publication Data

US 2022/0375230 A1 Nov. 24, 2022

(30) Foreign Application Priority Data

May 24, 2021 (JP) .................................. 2021-086934

(51) Int. Cl.
*G06V 10/764* (2022.01)
*G06T 7/70* (2017.01)
*G06V 20/58* (2022.01)

(52) U.S. Cl.
CPC ................ *G06V 20/58* (2022.01); *G06T 7/70* (2017.01); *G06V 10/764* (2022.01); *G06T 2207/30252* (2013.01)

(58) Field of Classification Search
CPC . G06T 2207/20084; G06T 2207/30252; G06T 2207/30261; G06T 7/70; G06T 7/73; G06V 10/764; G06V 20/58
See application file for complete search history.

(56) References Cited

U.S. PATENT DOCUMENTS

| | | | | |
|---|---|---|---|---|
| 2006/0182313 A1* | 8/2006 | Miyahara | ............... | G06V 20/58 382/104 |
| 2015/0200984 A1* | 7/2015 | Jung | ................... | G06Q 50/265 709/204 |
| 2015/0229886 A1* | 8/2015 | Jung | ...................... | H04N 7/181 348/148 |
| 2015/0269449 A1* | 9/2015 | Kosaki | ................... | G06F 18/28 382/103 |
| 2015/0269733 A1* | 9/2015 | Kosaki | ................... | G06T 7/536 382/107 |

(Continued)

FOREIGN PATENT DOCUMENTS

| | | |
|---|---|---|
| JP | 2012-021883 A | 2/2012 |
| JP | 2014-106901 A | 6/2014 |

(Continued)

*Primary Examiner* — Tsung Yin Tsai
(74) *Attorney, Agent, or Firm* — Oliff PLC

(57) ABSTRACT

An apparatus for estimating distance inputs an outside image representing the situation around a vehicle and obtained from a camera mounted on the vehicle into a classifier to detect a vehicle region representing a target vehicle and to classify the target vehicle represented in the detected vehicle region as one of preregistered types of vehicles. The apparatus then identifies the position of a virtual object corresponding to the target vehicle represented in the vehicle region, and estimates the distance from the vehicle to the virtual object as the distance from the vehicle to the target vehicle.

4 Claims, 6 Drawing Sheets

(56) References Cited

U.S. PATENT DOCUMENTS

| | | | |
|---|---|---|---|
| 2019/0026572 A1* | 1/2019 | Theodosis | G06V 20/586 |
| 2019/0191106 A1* | 6/2019 | Dabral | G06T 7/80 |
| 2022/0375230 A1* | 11/2022 | Makita | G06V 20/58 |

FOREIGN PATENT DOCUMENTS

| | | |
|---|---|---|
| JP | 2015-182604 A | 10/2015 |
| JP | 2018-103730 A | 7/2018 |

* cited by examiner

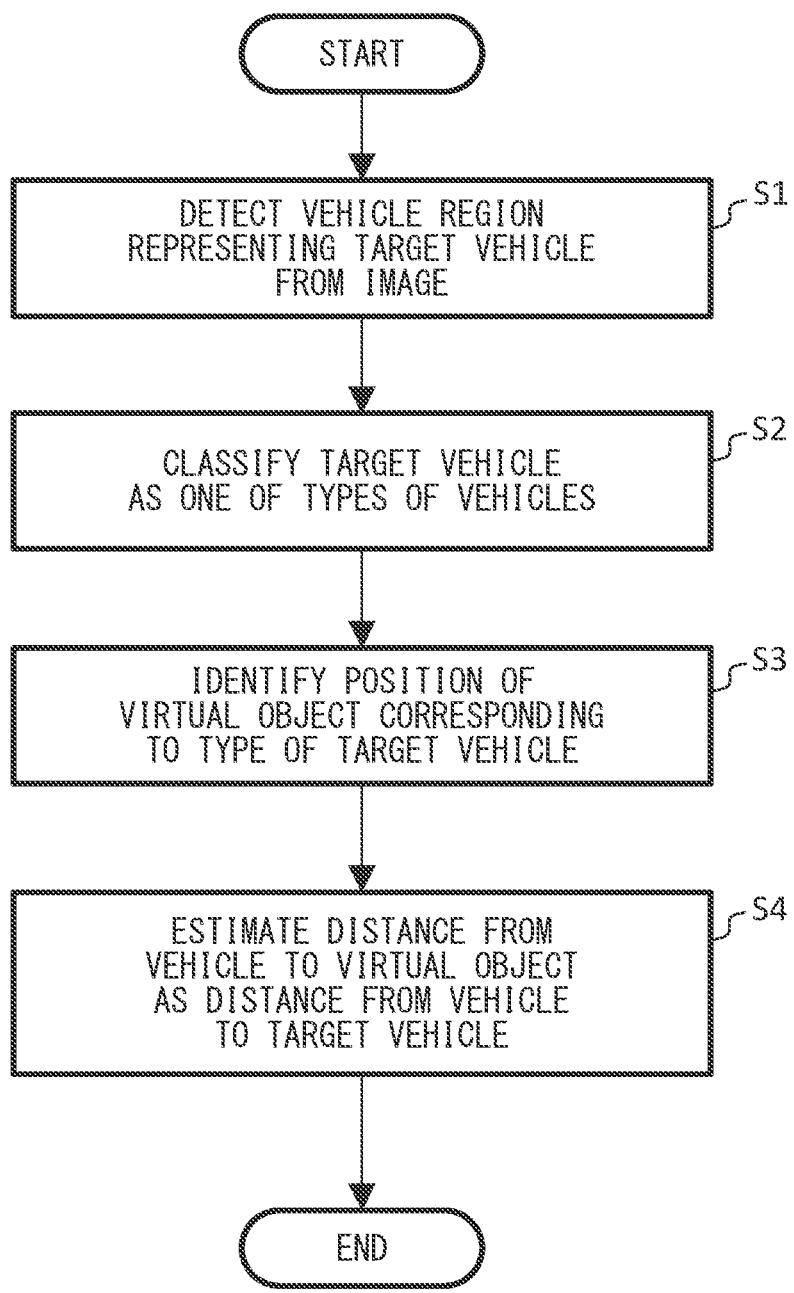

APPARATUS AND METHOD FOR ESTIMATING DISTANCE AND NON-TRANSITORY COMPUTER-READABLE MEDIUM CONTAINING COMPUTER PROGRAM FOR ESTIMATING DISTANCE

FIELD

The present disclosure relates to an apparatus, a method, and a computer program for estimating the distance from a vehicle to a target vehicle in an area around the vehicle.

BACKGROUND

A travel controller that controls travel of a vehicle without being operated by a driver requires the positional relationship between the vehicle and objects, such as other vehicles around the vehicle, to set a trajectory such that the vehicle will not collide with the objects.

Japanese Unexamined Patent Publication No. 2014-106901 (hereafter, "Patent Literature 1") describes a collision detection system for detecting an object that may approach and collide with a host vehicle. The collision detection system described in Patent Literature 1 calculates optical flow from an image representing the situation ahead of the vehicle, groups the optical flow regarding other vehicles represented in the image, sets a frame surrounding a group of optical flow, and calculates the distance to a target vehicle, using the width of the frame and that of a typical vehicle in the real space.

SUMMARY

An object region in an image representing a target vehicle inclining relative to the travel direction of a host vehicle includes a side surface of the target vehicle as well as its back. In this case, the accuracy of estimation of the distance to the target vehicle is low because the object region is wider than the back of the target vehicle in the image. In particular, as the distance from the host vehicle to the target vehicle increases, the target vehicle in the image shrinks and it becomes difficult to identify the back of the target vehicle from the image correctly. The distance to the target vehicle may be estimated using the three-dimensional orientation of the target vehicle detected by a classifier that can detect the three-dimensional orientation of a target vehicle from an image. However, in this case, the annotation cost of making training data used for training the classifier will be enormous.

It is an object of the present disclosure to provide an apparatus that can estimate the distance to a target vehicle appropriately without excessively increasing annotation cost of training data used for training a classifier.

An apparatus for estimating distance according to the present invention includes a processor configured to input an outside image representing the situation around a vehicle and obtained from a camera mounted on the vehicle into a classifier to detect a vehicle region at least including a front-back area or a side area of a target vehicle from the outside image and to classify the target vehicle represented in the detected vehicle region as one of preregistered types of vehicles. The front-back area represents a front or a back of the target vehicle, and the side area represents neither the front nor the back. The processor of the apparatus is further configured to identify the position of a virtual object whose orientation forms an angle expressed as the ratio between the widths of the front-back area and the side area with the orientation of the camera, and estimate the distance from the vehicle to the virtual object as the distance from the vehicle to the target vehicle, based on the identified position of the virtual object. Of standard vehicle lengths and standard vehicle widths stored in a memory in association with the respective types of vehicles, the virtual object has a standard vehicle length and a standard vehicle width stored in association with the type of the target vehicle represented in the vehicle region.

Regarding the target vehicle represented in the vehicle region that does not include the side area, the processor of the apparatus according to the present disclosure in estimating preferably further identifies the position of the virtual object whose angle formed with the orientation of the vehicle is an angle indicating the direction of the target vehicle detected from the outside image, and estimates the distance from the vehicle to the virtual object, based on the identified position of the virtual object.

A method for estimating distance according to the present disclosure includes inputting an outside image representing the situation around a vehicle and obtained from a camera mounted on the vehicle into a classifier to detect a vehicle region at least including a front-back area or a side area of a target vehicle from the outside image and to classify the target vehicle represented in the detected vehicle region as one of preregistered types of vehicles. The front-back area represents a front or a back of the target vehicle, and the side area represents neither the front nor the back. The method further includes identifying the position of a virtual object whose orientation forms an angle expressed as the ratio between the widths of the front-back area and the side area with the orientation of the camera; and estimating the distance from the vehicle to the virtual object as the distance from the vehicle to the target vehicle, based on the identified position of the virtual object. Of standard vehicle lengths and standard vehicle widths stored in a memory in association with the respective types of vehicles, the virtual object has a standard vehicle length and a standard vehicle width stored in association with the type of the target vehicle represented in the vehicle region.

A computer program for estimating distance stored in a non-transitory computer-readable medium according to the present disclosure causes a processor mounted on a vehicle to execute a process including inputting an outside image representing the situation around the vehicle and obtained from a camera mounted on the vehicle into a classifier to detect a vehicle region at least including a front-back area or a side area of a target vehicle from the outside image and to classify the target vehicle represented in the detected vehicle region as one of preregistered types of vehicles. The front-back area represents a front or a back of the target vehicle, and the side area represents neither the front nor the back. The process further includes identifying the position of a virtual object whose orientation forms an angle expressed as the ratio between the widths of the front-back area and the side area with the orientation of the camera; and estimating the distance from the vehicle to the virtual object as the distance from the vehicle to the target vehicle, based on the identified position of the virtual object. Of standard vehicle lengths and standard vehicle widths stored in a memory in association with the respective types of vehicles, the virtual object has a standard vehicle length and a standard vehicle width stored in association with the type of the target vehicle represented in the vehicle region.

The apparatus according to the present disclosure can estimate the distance to a target vehicle appropriately without excessively increasing annotation cost of training data used for training a classifier.

BRIEF DESCRIPTION OF DRAWINGS

FIG. 8 is a flowchart of a distance estimation process.

DESCRIPTION OF EMBODIMENTS

An apparatus that can estimate the distance to a target vehicle appropriately without excessively increasing annotation cost of training data used for training a classifier will now be described in detail with reference to the attached drawings. The apparatus for estimating distance according to the present disclosure inputs an outside image representing the situation around a vehicle and obtained from a camera mounted on the vehicle into a classifier to detect a vehicle region representing a target vehicle and to classify the target vehicle represented in the detected vehicle region as one of preregistered types of vehicles. In the apparatus of the present disclosure, the vehicle region at least includes a front-back area or a side area of the target vehicle. The front-back area represents a front or a back of the target vehicle, and the side area represents neither the front nor the back. The apparatus of the present disclosure then identifies the position of a virtual object corresponding to the target vehicle represented in the vehicle region. Of standard vehicle lengths and standard vehicle widths stored in a memory in association with the respective types of vehicles, the virtual object has a standard vehicle length and a standard vehicle width stored in association with the type of the target vehicle represented in the vehicle region. In identification of the position of the virtual object, the angle formed between the orientations of the virtual object and the camera is expressed as the ratio between the widths of the front-back area and the side area. The apparatus of the present disclosure then estimates the distance from the vehicle to the virtual object as the distance from the vehicle to the target vehicle, based on the identified position of the virtual object.

Figure 1:
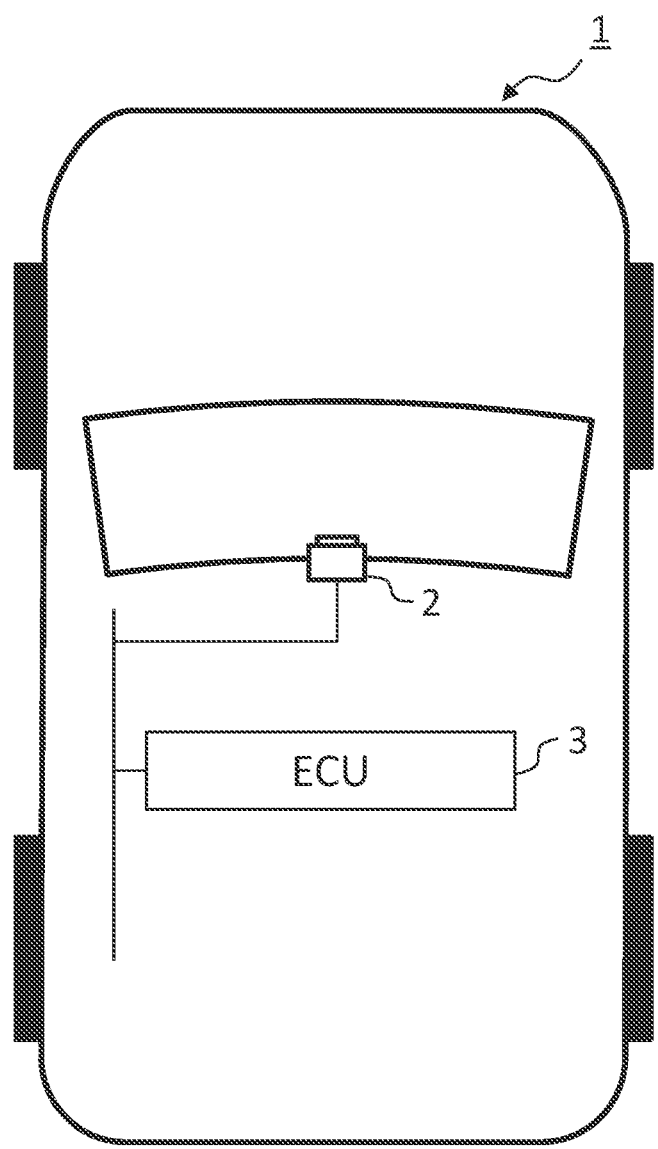
FIG. 1 schematically illustrates the configuration of a vehicle equipped with an apparatus for estimating distance.

FIG. 1 schematically illustrates the configuration of a vehicle equipped with the apparatus for estimating distance.

The vehicle 1 includes a camera 2 and an electronic control unit (ECU) 3, which is an example of the apparatus for estimating distance. The camera 2 is connected to the ECU 3 via an in-vehicle network conforming to a standard, such as a controller area network, so that they can communicate with each other.

The camera 2 is an example of the image capturing unit that outputs an outside image representing the situation around the vehicle. The camera 2 includes a two-dimensional detector constructed from an array of optoelectronic transducers, such as CCD or C-MOS, having sensitivity to visible light and a focusing optical system that forms an image of a target region on the two-dimensional detector. The camera 2 is disposed, for example, in a front and upper area in the interior of the vehicle and oriented forward, takes a picture of the situation around the vehicle 1 through a windshield every predetermined capturing period (e.g., 1/30 to 1/10 seconds), and outputs outside images corresponding to the surrounding situation. The images are examples of data outputted from a sensor.

The ECU 3 includes a communication interface, a memory, and a processor. The ECU 3 estimates the distances to objects around the vehicle 1, based on an outside image received from the camera 2 via the communication interface.

Additionally, the ECU 3 generates a trajectory such that the vehicle 1 will be separated from any of the objects around the vehicle more than a certain distance, and outputs a control signal to a travel mechanism (not shown) of the vehicle 1 so that the vehicle 1 will travel along the trajectory. The travel mechanism includes, for example, an engine or a motor for powering the vehicle 1, brakes for decelerating the vehicle 1, and a steering mechanism for steering the vehicle 1.

Figure 2:
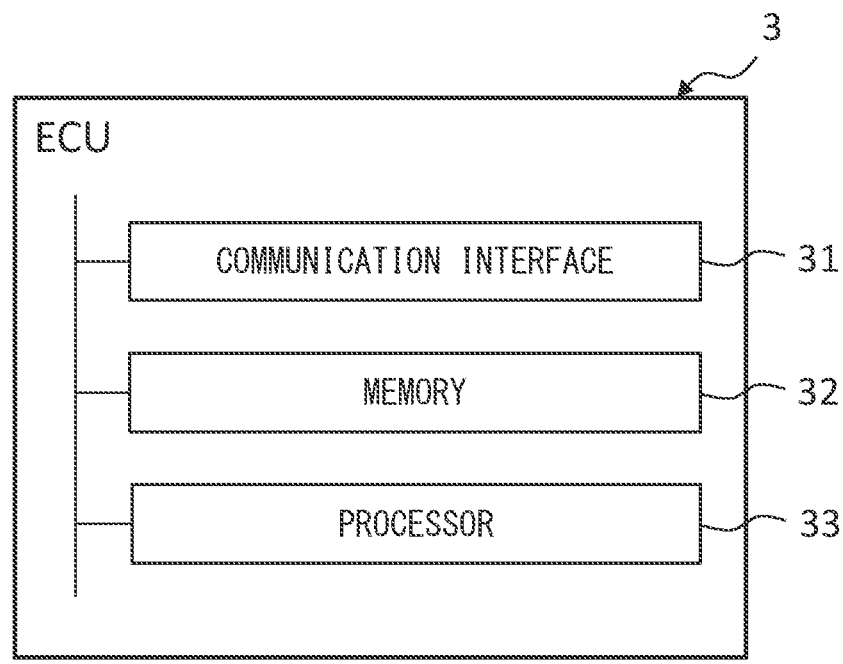
FIG. 2 schematically illustrates the hardware of an ECU.

FIG. 2 schematically illustrates the hardware of the ECU 3. The ECU 3 includes a communication interface 31, a memory 32, and a processor 33.

The communication interface 31, which is an example of a communication unit, includes a communication interface circuit for connecting the ECU 3 to the in-vehicle network. The communication interface 31 provides received data for the processor 33, and outputs data provided from the processor 33 to an external device.

The memory 32, which is an example of the storage unit, includes volatile and nonvolatile semiconductor memories. The memory 32 contains various types of data used for processing by the processor 33, e.g., the focal length of the taking lens of the camera 2, and a set of parameters for defining a neural network that functions as a classifier for detecting a vehicle region and the type of target vehicle from an outside image (e.g., the number of layers, layer configuration, kernels, and weighting factors). The memory 32 further contains standard vehicle lengths and standard vehicle widths in association with respective types of vehicles. The memory 32 further contains various application programs, such as a distance estimation program to execute a distance estimation process.

The processor 33, which is an example of a control unit, includes one or more processors and a peripheral circuit thereof. The processor 33 may further include another operating circuit, such as a logic-arithmetic unit, an arithmetic unit, or a graphics processing unit.

Figure 3:
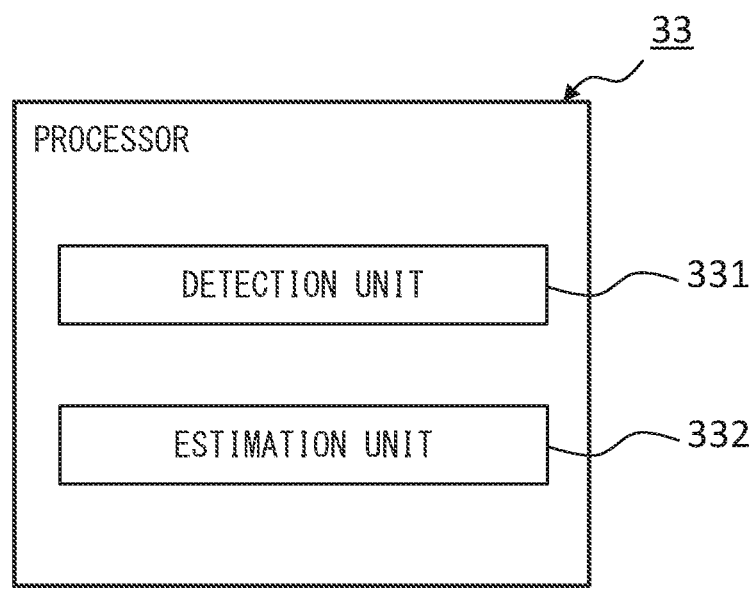
FIG. 3 is a functional block diagram of a processor included in the ECU.

FIG. 3 is a functional block diagram of the processor 33 included in the ECU 3.

As its functional blocks, the processor 33 of the ECU 3 includes a detection unit 331 and an estimation unit 332. These units included in the processor 33 are functional modules implemented by a program executed on the processor 33. The computer program for achieving the functions of the units of the processor 33 may be provided in a form recorded on a computer-readable and portable medium, such as a semiconductor memory, a magnetic recording medium, or an optical recording medium. Alternatively, the units included in the processor 33 may be implemented in the ECU 3 as separate integrated circuits, microprocessors, or firmware.

The detection unit 331 inputs an outside image representing the situation around the vehicle into a classifier to detect a vehicle region representing a target vehicle and to classify the target vehicle represented in the detected vehicle region as one of predetermined types of vehicles, such as a passenger vehicle, a truck, and a bus.

The vehicle region at least includes a front-back area or a side area of the target vehicle. The front-back area represents a front or a back of the target vehicle, and the side area represents neither the front nor the back.

Figure 4:
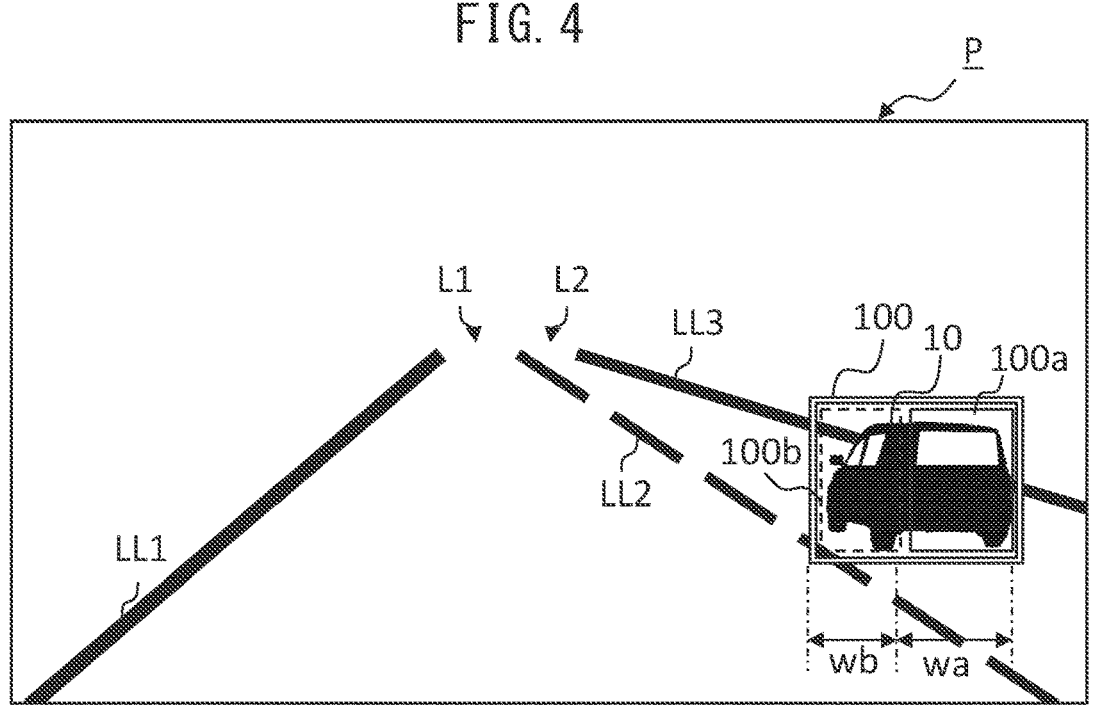
FIG. 4 is a schematic diagram for explaining detection of a vehicle region.

FIG. 4 is a schematic diagram for explaining detection of a vehicle region.

The outside image P shown in FIG. 4 represents a lane L1 demarcated by lane-dividing lines LL1 and LL2 and a lane L2 adjoining the lane L1 and demarcated by lane-dividing lines LL2 and LL3. The vehicle 1 and a target vehicle 10 are traveling on the lanes L1 and L2, respectively.

The detection unit 331 inputs the outside image P into a classifier to detect a vehicle region and to identify the type of the target vehicle represented in the vehicle region. In the example of FIG. 4, the detection unit 331 detects a vehicle region 100 representing the target vehicle 10, and identifies the type of the target vehicle 10 as the type "passenger vehicle." The memory 32 contains a standard vehicle length "4.5 m" and a standard vehicle width "1.75 m" corresponding to the type "passenger vehicle." Besides the type "passenger vehicle," the memory 32 also contains, for example, a standard vehicle length "10 m" and a standard vehicle width "2.4 m" for the type "truck" as well as a standard vehicle length "12 m" and a standard vehicle width "2.5 m" for the type "bus."

The classifier may be, for example, a convolutional neural network (CNN) including convolution layers connected in series from the input toward the output. Images representing target vehicles with annotations of the boundaries between the front-back areas and the side areas of the target vehicles in the images and the types of vehicles corresponding to the target vehicles in the images are inputted into a CNN as training data. The CNN that has been trained with these images functions as a classifier to detect a vehicle region and the type of vehicle from an image.

The annotation cost of training data with annotations of the boundaries between the front-back areas and the side areas of target vehicles is approximately 1.05 times that of training data in which only vehicle regions corresponding to target vehicles represented in images are annotated. In other words, the annotation cost of training data with annotations of the boundaries between the front-back areas and the side areas of target vehicles is much lower than that of training data with annotations of three-dimensional bounding boxes corresponding to target vehicles.

The estimation unit 332 identifies the position of a virtual object corresponding to a target vehicle represented in a vehicle region. Of the standard vehicle lengths and the standard vehicle widths stored in the memory in association with the respective types of vehicles, the virtual object has a standard vehicle length and a standard vehicle width stored in association with the type of the target vehicle represented in the vehicle region. In identification of the position of the virtual object, the angle formed between the orientations of the virtual object and the vehicle is expressed as the ratio between the widths of the front-back area and the side area.

Figure 5:
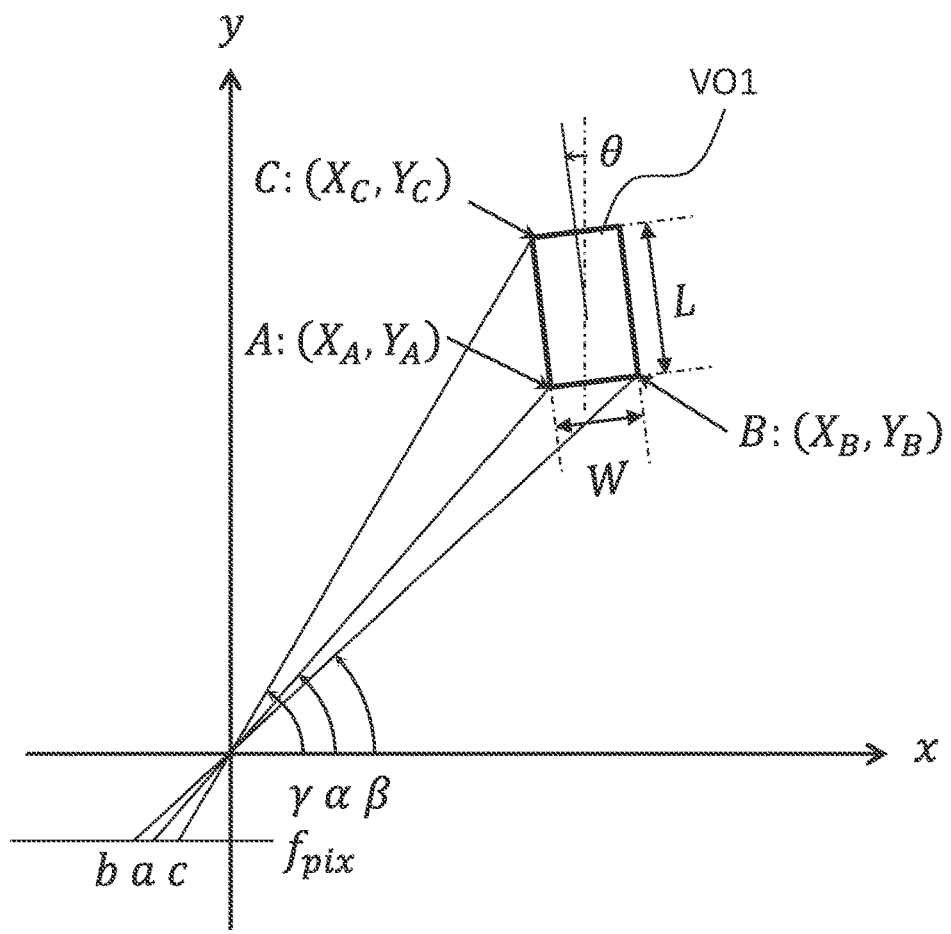
FIG. 5 is a first schematic diagram illustrating how a virtual object corresponding to a target vehicle is placed.

FIG. 5 is a first schematic diagram illustrating how a virtual object corresponding to a target vehicle is placed.

Assume that a virtual object VO1 corresponding to the target vehicle 10 is disposed in a camera coordinate system in which the position of the optical center in the imaging optical system of the camera 2 mounted on the vehicle 1 is the origin, the travel direction of the vehicle 1 is the y-axis, and the x-axis perpendicular to the y-axis is set along the surface of a road being traveled by the vehicle 1. The width W and the length L of the virtual object VO1 represented as a rectangular parallelepiped correspond to a standard vehicle width and a standard vehicle length, respectively, stored in the memory 32 in association with the type of the target vehicle. The estimation unit 332 identifies the coordinates of the point in the virtual object VO1 closest to the origin (point $A(X_A, Y_A)$ in FIG. 5) and the angle θ formed between the longitudinal direction of the virtual object VO1 and the y-axis.

The image of the virtual object VO1 is projected onto a plane that is a focal length $f_{pix}$ away from the origin in the y-axis direction opposite to the virtual object VO1. Points a, b, and c in the image correspond to points $A(X_A, Y_A)$, $B(X_B, Y_B)$, and $C(X_C, Y_C)$ of the virtual object VO1, respectively. The focal length $f_{pix}$ is a pixel distance obtained by dividing the focal length of the camera 2 in the imaging optical system by the resolution (mm/pixel).

Let the angle formed between a ray from point A through the origin to point a and the x-axis be α, the angle formed between a ray from point B through the origin to point b and the x-axis be β, and the angle formed between a ray from point C through the origin to point c and the x-axis be γ. Then, the angles α, β, and γ satisfy the following Expressions (1), (2), and (3).

$$\tan\alpha = \frac{-f_{pix}}{a} \quad (1)$$

$$\tan\beta = \frac{-f_{pix}}{b} \quad (2)$$

$$\tan\gamma = \frac{-f_{pix}}{c} \quad (3)$$

In the xy-plane shown in FIG. 5, points A, B, and C of the virtual object VO1 are vertices of a rectangle having a width W and a length L. Since this rectangle is inclined by θ relative to the y-axis, the coordinates of points A, B, and C can be expressed as follows.

$A:(X_A, Y_A)$ $B:(X_A + W \cos θ, Y_A + W \sin θ)$ $C:(X_A - δL \sin θ, Y_A + δL \cos θ)$ δ is a variable indicating whether the angle φ formed between the y-axis and the straight line connecting the center of the virtual object VO1 and the origin (hereafter, the "bearing angle") is greater than the angle θ formed between the y-axis and the longitudinal direction of the virtual object VO1 (hereafter, the "rotation angle").

Figure 6:
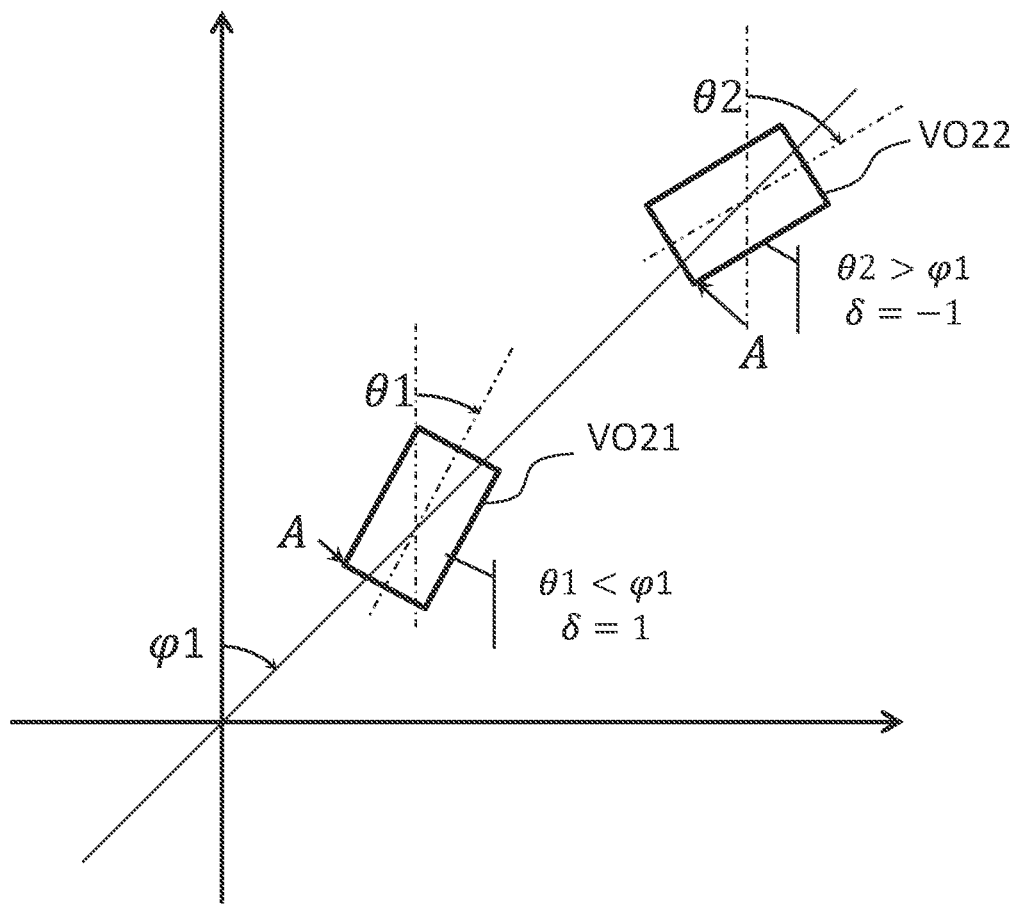
FIG. 6 is a second schematic diagram illustrating how a virtual object corresponding to a target vehicle is placed.

FIG. 6 is a second schematic diagram illustrating how a virtual object corresponding to a target vehicle is placed.

For each of virtual objects VO21 and VO22 represented in FIG. 6, the bearing angle formed between the y-axis and the straight line connecting the center of the object and the origin is φ1. The rotation angle θ1 of the virtual object VO21 is less than the bearing angle φ1. In this case, δ is 1. In contrast, the rotation angle θ2 of the virtual object VO22 is greater than the bearing angle φ1. In this case, δ is −1.

The variable δ can be expressed by the following Expression (4) with the values of points b and c, without using the bearing angle φ and the rotation angle θ.

$δ=1$ if $(b<c)$ else $−1$ \quad (4)

The angles α, β, and γ can be expressed by the following Expressions (5), (6), and (7) with the rotation angle θ.

$$\tan \alpha = \frac{Y_A}{X_A} \quad (5)$$

$$\tan \beta = \frac{Y_A + W \sin \theta}{X_A + W \cos \theta} \quad (6)$$

$$\tan \gamma = \frac{Y_A + \delta L \cos \theta}{X_A - \delta L \sin \theta} \quad (7)$$

Simplifying Expressions (5), (6), and (7) regarding the rotation angle θ leads to the following Expressions (8), (9), and (10).

$$p \sin \theta + q \cos \theta = 0 \quad (8)$$

$$p = W(\tan \alpha - \tan \gamma) - \delta L \tan \gamma (\tan \alpha - \tan \beta) \quad (9)$$

$$q = -\delta L (\tan \alpha - \tan \beta) - W \tan \beta (\tan \alpha - \tan \gamma) \quad (10)$$

Expression (8), (9), (10) can be solved for the rotation angle θ as shown in the following Expression (11), and $X_A$ and $Y_A$ can be expressed by the following Expressions (12) and (13), respectively.

$$\theta = \tan^{-1}\left(-\frac{p}{q}\right) \quad (11)$$

$$X_A = \frac{\delta W(-\sin \theta + \tan \beta \cos \theta)}{\tan \alpha - \tan \beta} \quad (12)$$

$$Y_A = X_A \tan \alpha \quad (13)$$

Depending on the position and the angle of the target vehicle, e.g., when the difference between the bearing angle φ and the rotation angle θ of the target vehicle is around a multiple of π/2 (0, π/2, π, 3π/2, . . . ), not all of three points A, B, and C are detected from its vehicle region in some cases. In this case, only the front, the back, or a side surface of the target vehicle is represented in the vehicle region, and thus the position of the virtual object cannot be identified using the above expressions.

Figure 7:
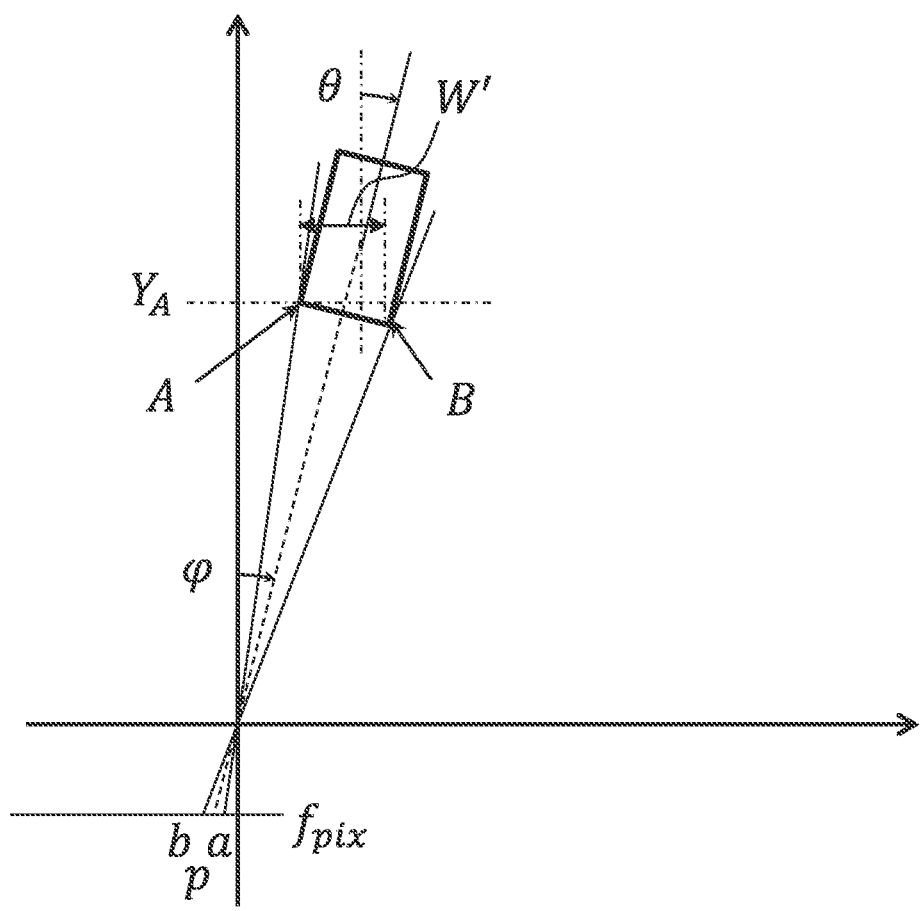
FIG. 7 is a third schematic diagram illustrating how a virtual object corresponding to a target vehicle is placed.

FIG. 7 is a third schematic diagram illustrating how a virtual object corresponding to a target vehicle is placed.

FIG. 7 illustrates how a virtual object is placed for the case that the bearing angle φ and the rotation angle θ of a target vehicle are approximately equal. The bearing angle φ is formed between the direction to the center of the virtual object and an axis of the camera coordinate system. Since the central position of the target vehicle is not represented in the outside image, let the midpoint p of both endpoints (a and b) of the vehicle region in the outside image be the center of the virtual object. Then, the bearing angle φ is expressed by the following Expression (14).

$$\tan \varphi = \frac{-p}{f_{pix}} \quad (14)$$

Approximation φ≈θ enables the projection of the width W (or the length L) onto a straight line parallel to the x-axis in the camera coordinate system. Using a width-based basic distance-measuring technique based on similarity of triangles, $X_A$ and $Y_A$ can be expressed as follows.

$$W' = W \cos \varphi \quad (15)$$

$$W' : Y_A \cong w : f_{pix} \quad (16)$$

$$X_A = Y_A \tan \varphi \quad (17)$$

In Expression (16), w indicates the width of the vehicle region in the outside image, i.e., the distance between points a and b.

In general, it is when the target vehicle is located ahead of and far from the vehicle 1 that the bearing angle φ and the rotation angle θ of the target vehicle are approximately equal at detection of a vehicle region from an outside image representing the situation ahead of the vehicle 1. When the target vehicle is located ahead of and far from the vehicle 1, the bearing angle φ is nearly 0 and the error in the approximation of Expression (16) is small, which enables the position of the virtual object to be identified more appropriately.

The estimation unit 332 determines the distance from the vehicle 1 to the virtual object, based on the identified position of the virtual object, thereby estimating the distance from the vehicle 1 to the target vehicle.

The estimation unit 332 calculates a square root of $X_A^2 + Y_A^2$ regarding point $A(X_A, Y_A)$ of the virtual object closest to the origin to determine the distance from the vehicle 1 to the virtual object.

FIG. 8 is a flowchart of a distance estimation process. Whenever receiving an outside image from the camera 2, the ECU 3 executes the distance estimation process described below.

The detection unit 331 of the ECU 3 inputs an outside image obtained from the camera 2 into a classifier to detect a vehicle region representing a target vehicle (step S1). Additionally, the detection unit 331 inputs the outside image into a classifier to classify the target vehicle as one of preregistered types of vehicles (step S2). The detection unit 331 may execute detection of a vehicle region and classification as a type of vehicle in a single process step by inputting the outside image into a classifier that has been trained to execute them in parallel.

Next, the estimation unit 332 of the ECU 3 identifies the position of a virtual object corresponding to the type of the target vehicle (step S3). The estimation unit 332 then estimates the distance from the vehicle to the virtual object as the distance from the vehicle to the target vehicle (step S4), and terminates the distance estimation process.

This distance estimation process enables the ECU 3 to estimate the distance to a target vehicle appropriately without excessively increasing annotation cost of training data used for training a classifier.

Note that those skilled in the art can apply various changes, substitutions, and modifications without departing from the spirit and scope of the present invention.

What is claimed is:

1. An apparatus for estimating distance, comprising a processor configured to
input an outside image representing the situation around a vehicle and obtained from a camera mounted on the vehicle into a classifier to detect a vehicle region at least including a front-back area or a side area of a target vehicle, that is different from the vehicle, from the outside image and to classify the target vehicle represented in the detected vehicle region as one of preregistered types of vehicles, the front-back area representing a front or a back of the target vehicle, the side area representing neither the front nor the back, and identify the position of a virtual object whose orientation forms an angle expressed as the ratio between the widths of the front-back area and the side area with the orientation of the camera, the widths of the front-back area and the side area being determined based on the type of the target vehicle represented in the detected vehicle region as classified, and estimate the distance from the vehicle to the virtual object as the distance from the vehicle to the target vehicle, based on the identified position of the virtual object, wherein of standard vehicle lengths and standard vehicle widths stored in a memory in association with the respective types of vehicles, the virtual object has a standard vehicle length and a standard vehicle width stored in association with the type of the target vehicle represented in the vehicle region.

2. The apparatus according to claim 1, wherein regarding the target vehicle represented in the vehicle region that does not include the side area, the processor identifies the position of the virtual object whose angle formed with the orientation of the vehicle is an angle indicating the direction of the target vehicle detected from the outside image, and estimates the distance from the vehicle to the virtual object, based on the identified position of the virtual object.

3. A method for estimating distance, comprising:
  inputting an outside image representing the situation around a vehicle and obtained from a camera mounted on the vehicle into a classifier to detect a vehicle region at least including a front-back area or a side area of a target vehicle, that is different from the vehicle, from the outside image and to classify the target vehicle represented in the detected vehicle region as one of preregistered types of vehicles, the front-back area representing a front or a back of the target vehicle, the side area representing neither the front nor the back;
  identifying the position of a virtual object whose orientation forms an angle expressed as the ratio between the widths of the front-back area and the side area with the orientation of the camera, the widths of the front-back area and the side area being determined based on the type of the target vehicle represented in the detected vehicle region as classified, wherein of standard vehicle lengths and standard vehicle widths stored in a memory in association with the respective types of vehicles, the virtual object has a standard vehicle length and a standard vehicle width stored in association with the type of the target vehicle represented in the vehicle region; and
  estimating the distance from the vehicle to the virtual object as the distance from the vehicle to the target vehicle, based on the identified position of the virtual object.

4. A non-transitory computer-readable medium having a computer program for estimating distance stored therein, the computer program causing a processor mounted on a vehicle to execute a process comprising:
  inputting an outside image representing the situation around the vehicle and obtained from a camera mounted on the vehicle into a classifier to detect a vehicle region at least including a front-back area or a side area of a target vehicle, that is different from the vehicle, from the outside image and to classify the target vehicle represented in the detected vehicle region as one of preregistered types of vehicles, the front-back area representing a front or a back of the target vehicle, the side area representing neither the front nor the back;
  identifying the position of a virtual object whose orientation forms an angle expressed as the ratio between the widths of the front-back area and the side area with the orientation of the camera, the widths of the front-back area and the side area being determined based on the type of the target vehicle represented in the detected vehicle region as classified, wherein of standard vehicle lengths and standard vehicle widths stored in a memory in association with the respective types of vehicles, the virtual object has a standard vehicle length and a standard vehicle width stored in association with the type of the target vehicle represented in the vehicle region; and
  estimating the distance from the vehicle to the virtual object as the distance from the vehicle to the target vehicle, based on the identified position of the virtual object.

* * * * *